(12) United States Patent
Lowry et al.

(10) Patent No.: US 9,515,948 B2
(45) Date of Patent: Dec. 6, 2016

(54) TECHNIQUES FOR GENERICALLY ACCESSING DATA

(71) Applicant: Novell, Inc., Provo, UT (US)

(72) Inventors: Lee Edward Lowry, Orem, UT (US); Brent Thurgood, Spanish Fork, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 226 days.

(21) Appl. No.: 13/864,693

(22) Filed: Apr. 17, 2013

(65) Prior Publication Data

US 2013/0232266 A1    Sep. 5, 2013

Related U.S. Application Data

(63) Continuation of application No. 12/696,849, filed on Jan. 29, 2010, now Pat. No. 8,447,768.

(51) Int. Cl.
| | | |
|---|---|---|
| G06F 17/30 | (2006.01) | |
| H04L 12/911 | (2013.01) | |
| G06F 7/00 | (2006.01) | |
| G06F 15/16 | (2006.01) | |

(52) U.S. Cl.
CPC ............. H04L 47/70 (2013.01); G06F 7/00 (2013.01); G06F 15/16 (2013.01); G06F 17/30 (2013.01)

(58) Field of Classification Search
None
See application file for complete search history.

(56) References Cited

U.S. PATENT DOCUMENTS

| | | | |
|---|---|---|---|
| 6,327,591 B1* | 12/2001 | Osborn et al. | |
| 7,505,978 B2 | 3/2009 | Bodin et al. | |
| 7,599,959 B2 | 10/2009 | Friedrich et al. | |
| 7,650,198 B2 | 1/2010 | Dorgelo et al. | |
| 7,805,416 B1 | 9/2010 | Compton et al. | |
| 7,930,299 B2* | 4/2011 | Yuval et al. | 707/722 |
| 2001/0009016 A1* | 7/2001 | Hofmann et al. | 709/219 |
| 2001/0039540 A1* | 11/2001 | Hofmann et al. | 707/3 |
| 2002/0036794 A1* | 3/2002 | Boehmer et al. | 358/1.15 |
| 2004/0138956 A1 | 7/2004 | Main et al. | |
| 2005/0108526 A1* | 5/2005 | Robertson | 713/166 |
| 2006/0165040 A1 | 7/2006 | Rathod et al. | |
| 2006/0277220 A1* | 12/2006 | Patrick et al. | 707/200 |
| 2008/0104133 A1* | 5/2008 | Chellappa et al. | 707/201 |
| 2008/0263214 A1* | 10/2008 | Austin et al. | 709/229 |
| 2009/0024594 A1 | 1/2009 | Nolan et al. | |
| 2009/0300002 A1* | 12/2009 | Thomas et al. | 707/5 |
| 2010/0010999 A1 | 1/2010 | Gerovac et al. | |
| 2010/0146291 A1* | 6/2010 | Anbuselvan | 713/189 |

(Continued)

OTHER PUBLICATIONS

"U.S. Appl. No. 12/696,849 , Response filed Jan. 15, 2013 to Final Office Action mailed Oct. 25, 2012", 8 pgs.

(Continued)

Primary Examiner — Jay Morrison
(74) Attorney, Agent, or Firm — Schwegman Lundberg & Woessner, P.A.

(57) ABSTRACT

Techniques for generic data access are provided. A middle-tier server agent uses data providers that can communicate with backend resources. A request received in a first format is used to identify a specific data provider by the middle-tier server agent; the data provider uses the first format to communicate with a specific backend resource in a second format. Results from the specific backend resource are returned from the data provider in the first format and passed to a client that initially made the request.

20 Claims, 3 Drawing Sheets

(56) References Cited

U.S. PATENT DOCUMENTS

2011/0131190 A1\* 6/2011 Pooley et al. ............... 707/702
2011/0191308 A1 8/2011 Lowry et al.

OTHER PUBLICATIONS

"U.S. Appl. No. 12/696,849 , Response filed May 9, 2012 to Final Office Action mailed Mar. 9, 2012", 7 pgs.
"U.S. Appl. No. 12/696,849, Advisory Action mailed Feb. 21, 2013", 3 pgs.
"U.S. Appl. No. 12/696,849, Advisory Action mailed May 16, 2012", 3 pgs.
"U.S. Appl. No. 12/696,849, Final Office Action mailed Mar. 9, 2012", 19 pgs.
"U.S. Appl. No. 12/696,849, Final Office Action mailed Oct. 25, 2012", 20 pgs.
"U.S. Appl. No. 12/696,849, Non Final Office Action mailed Jul. 12, 2012", 20 pgs.
"U.S. Appl. No. 12/696,849, Non Final Office Action mailed Nov. 14, 2011", 14 pgs.
"U.S. Appl. No. 12/696,849, Notice of Allowance mailed Mar. 7, 2013", 9 pgs.
"U.S. Appl. No. 12/696,849, Response filed Feb. 14, 2012 to Non Final Office Action mailed Nov. 14, 2011", 8 pgs.
"U.S. Appl. No. 12/696,849, Response filed Oct. 12, 2012 to Non Final Office Action mailed Jul. 12, 2012", 7 pgs.
"U.S. Appl. No. 12/696,849, Restriction Requirement mailed Oct. 19, 2011", 5 pgs.
"Create Object Models Using Extensible Abstract Model (XAM)", http://xml.netbeans.org/xam-usage.html, (Nov. 2009).
"UI Guidelines for SAP CRM WebClient User Interface—Version 1.4", https://www.sdn.sap.com/irj/sdn/go/portal/prtroot/docs/library/uuid/302d8152-002b-2b10-34bd-9ff3c712dd4b, (May 14, 2008), 103 pgs.
Jennings, Roger, "Professional ADO.NET 3.5 with LI NQ And the Entity Framework", (Feb. 3, 2009), 241 pgs.
Khosravi, Shahram, "Writing Generic Data Access Code in ASP.NET 2.0 and ADO.NET 2.0", ADO.NET Technical Articles, http://msdn.microsoft.com/en-us/library/ms971499.aspx, (Apr. 2005).
Lysle, Scott, "Generic Data Access using LINQ to SQL and C#", Mindcracker LLC, http://www.c-sharpcorner.com/UploadFile/scottlysle/GenericL2SinCS07212008041344AM/GenericL2SinCS.aspx, (Jul. 22, 2008).
Spaanjaars, Imar, "Beginning ASP.NET 3.5: in C# and VB", (Mar. 4, 2008), 105 pgs.

\* cited by examiner

TECHNIQUES FOR GENERICALLY ACCESSING DATA

This application is a continuation of U.S. patent application Ser. No. 12/696,849, filed Jan. 29, 2010, which is incorporated herein by reference in its entirety.

BACKGROUND

In a client-server environment, clients generally have user interface (UI) code to make calls to backend data systems or even intermediary systems, which directly access the backend systems, for access to data. The client UI is often tightly coupled to the intermediary or backend systems. Consequently, when changes are made to the back end, the client UI needs updated or needs an entirely new client UI created.

Moreover, the ability to cache data associated with a backend system is often extremely dependent on the format, structure, and features of the back-end system. So, the client UI often has to include specifics about the backend systems in order to properly cache data from the backend system.

When the client UI lacks the ability to cache backend systems, the client experiences performance degradation, such that processing throughput diminishes or response times decrease. As a result, a user on the client may blame the service provider of the back-end system. So, the service provider may lose customers and business when client caching capabilities do not exist.

Furthermore, an enterprise, which supports multiple client UI's and their disparate environments, experience substantial support issues when backend systems are upgraded, changed, and/or swapped out for other different or replacement backend system. For example, consider an enterprise environment with 1,000 clients; each client has a specific client UI to access a Structured Query Language (SQL) backend database. When the backend database is switched or upgraded, the enterprise has to visit and update 1,000 client machines to install or cause to be installed an updated client UI.

Thus, it can be seen that improved techniques for accessing data are needed.

SUMMARY

In various embodiments, techniques for generically accessing data are presented. More specifically, and in an embodiment, a method for generically accessing data is provided. Specifically, a data request is received on a server for a backend resource from a client. The data request in a first format and the backend resource recognizes and processes a second format that is different from the first format. Next, a data provider is located on the server; the data provider communicates with the backend resource in the second format. Moreover, the data provider is used to process the data request in the second format. Results are acquired from the data provider in the first format and the results are provided to the client in the first format.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

Various embodiments of this invention can be implemented in existing network architectures. For example, in some embodiments, the techniques presented herein are implemented in whole or in part in the Novell® network and proxy server products, operating system products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
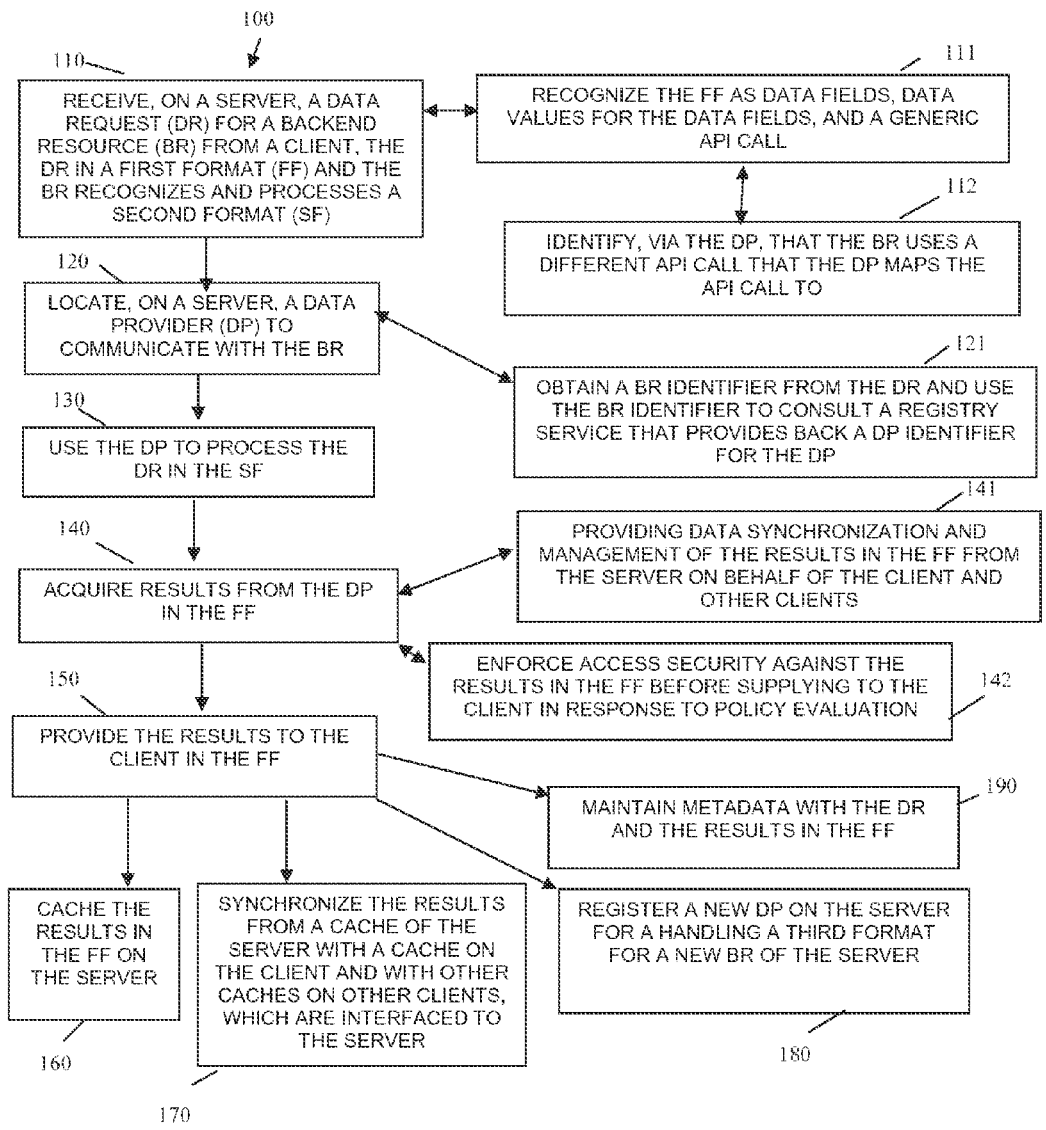
FIG. 1 is a diagram of a method for generically accessing data, according to an example embodiment.
Figure 2:
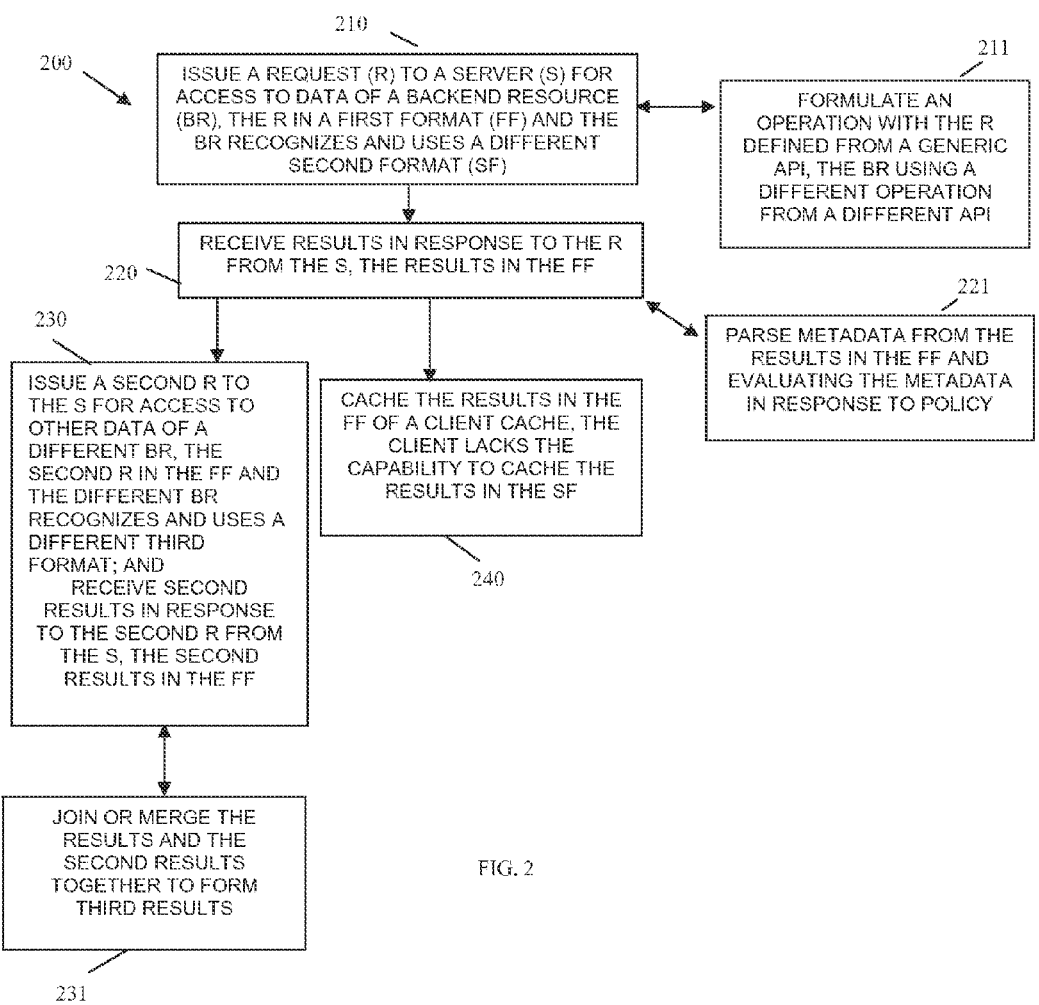
FIG. 2 is a diagram of another method for generically accessing data, according to an example embodiment.
Figure 3:
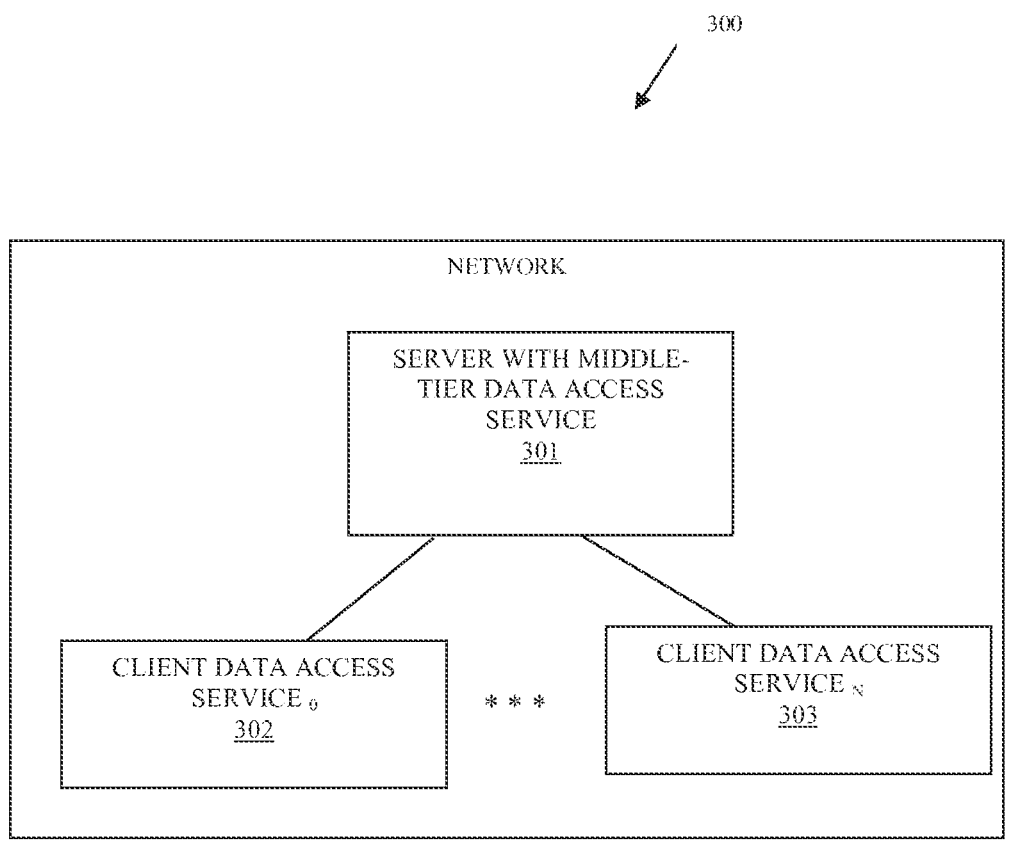
FIG. 3 is a diagram of a generic data access system, according to an example embodiment.

It is within this context that embodiments of the invention are now discussed within the context of FIGS. 1-3.

FIG. 1 is a diagram of a method 100 for generically accessing data, according to an example embodiment. The method 100 (hereinafter "middle-tier data access service") is implemented in a machine-accessible and computer-readable medium and instructions that execute on one or more processors (machines, computers, processors, etc.), such as a server. The machine is specifically configured to process the middle-tier data access service. Furthermore, the middle-tier data access service is operational over and processes within a network. The network may be wired, wireless, or a combination of wired and wireless.

In an embodiment, the middle-tier data access service acts generic intermediary for a plurality of disparate backend data resources. That is, the middle-tier data access service receives generic requests for access to specific ones of the backend resources and uses data providers to interface in data formats and with specific Applicant Programming Interface (API) calls understood by each of the backend resources. Results acquired from the backend resources are translated to generic formats and delivered to clients for manipulation, caching, and use on those clients in the generic data formats using generic API calls. More detailed descriptions and embodiments of the middle-tier data access service are now presented with reference to the FIG. 1.

At 110, the middle-tier data access service receives a data request for a backend resource from a client. The client uses a generic client User Interface (UI) to interact with the middle-tier data access service and make the data request. Moreover, the data request can include a variety of information. The data request itself is in a first format whereas the backend resource expects and can only process a second format. The first and second formats are different and disparate from one another. The backend resource can include a variety of resources, such as databases, data warehouses, custom applications, etc.

According to an embodiment, at 111, the middle-tier data access service recognizes the first format as data fields, data values for the data fields, and a generic Application Programming Interface (API) call or operation. For example, the data request may indicate "get Firstname=Lee from source=EMP_DB," here the data fields are Firstname and source, the data values are Lee and EMP_DB (Employee Database) and the API call is "get."

Continuing with the embodiment of 111 and at 112, the middle-tier data access service identifies via a data provider (discussed below with respect to the processing at 120) that the backend resource uses different API call that the data provider maps to the API call made in the first format. So, the backend resource maybe an SQL database and the entire request identified in 111 may be translated by the data provider into the following: "search employees where fname is Lee," here the different API call is "search" and not "get" as was used with the data request, fname is used as opposed to Firstname and employees is used as opposed to source=EMP_DB; in fact, the entire structure is different.

At 120, the middle-tier data access service locates a data provider to communicate with the backend resource. The data provider can be located on the server that executes the middle-tier data access service or on an entirely different server (one not executing the middle-tier data access service). Data providers are services that can translate between the first format (generic format) and specific data formats (second format and others) that are expected by particular backend resources. The middle-tier data access service locates the data provider that can interface with the backend resource based on the data request that is made.

For example, at 121, the middle-tier data access service obtains a backend resource identifier from the initial data request. The backend resource identifier is used to consult a registry service that provides back a data provider identifier for the data provider that can interact with the backend resource. Other approaches may be used as well, such as the middle-tier data access service may itself maintain a table that maps backend resources to particular data providers, and the like.

At 130, the middle-tier data access service uses the data provider to process the data request in the second format. That is, the data provider takes the data request in the first format and translates and maps it into data and commands that are recognizable and capable of being processed by the backend resource.

At 140, the middle-tier data access service acquires results from processing the data request in the first format (generic format). The data provider provides back to the middle-tier data access service the results in the first format. The backend resource provided the results in the second format and again the data provider performed a reverse translation and mapping to place the results in the first format, which are then supplied to the middle-tier data access service.

In an embodiment, at 141, the middle-tier data access service provides data synchronization and management of the results in the first format (generic or normalized format) on behalf of the client and other clients of the client-server architecture and the network.

In another situation, at 142, the middle-tier data access service enforces access security against the results in the first format before supplying to the client in response to policy evaluation. So, the middle-tier data access service can redact information or forbid certain parts of information contained in the results from reaching the client in response to the policy evaluation.

At 150, the middle-tier data access service provides the results to the client in the first format. So, the client makes a data request in a generic first format and then receives back results in the generic first format. However, the actual interface to the second and specific format was provided through the data provider in a manner that is entirely transparent to the client and the client UI. Therefore, the client UI can be generic and provide services based on just the generic first format.

According to an embodiment, at 160, the middle-tier data access service caches the results in the first format on the server that processes the middle-tier data access service.

In a specific situation, at 170, the middle-tier data access service synchronizes the results and/or allows the synchronization of the results from a global cache of the server to a cache on the client and to other caches on other clients, which are interfaced to the server.

In another situation, at 180, the middle-tier data access service registers a new data provider on the server for handling a third format for a new backend resource of the server. Thus, a registration service for registering data providers can be provided via the middle-tier data access service.

In another case, at 190, the middle-tier data access service maintains metadata with the data request and the results in the first format. The metadata can include a variety of information, such a principal identifier for a principal (user or automated service) that made the data request, a backend resource identifier, a data provider identifier, an operation identifier for any operation performed with the data request, a date and time stamp, an indication as to policy used and whether policy was violated, and the like. The metadata can be used to assist in enforcing security, auditing, logging, and reporting.

FIG. 2 is a diagram of another method 200 for generically accessing data, according to an example embodiment. The method 200 (hereinafter "client data service") is implemented in a machine-accessible and computer-readable storage medium as instructions that execute on one or more processors of a network node, such as a client. It is noted that multiple instances of the client data service execute on different clients of the network. So, the client data service is operational over a network. The network may be wired, wireless, or a combination of wired and wireless. Furthermore, the processor (client having a processing instance of the client data service) is specifically configured to process the client data service.

The middle-tier data access service represented by the method 100 of the FIG. 1 represents processing from the perspective of a server. The server offers access to a backend resource, such as a database, data warehouse, etc. The client data service represents processing from the perspective of one client on the network that interacts with the server via the middle-tier data access service. It is noted once again that multiple clients exist on the network; each client has a processing instance of the client data service and interacts with the middle-tier data access service in the manners discussed herein above and below.

At 210, the client data service issues a request to a server for access to a backend resource. The request is in a first format but the backend resource uses a second format that is entirely different from the first format that the request is made in. In an embodiment the client data service issues the request to the middle-tier data access service of the method 100 at 110.

According to an embodiment, at 211, the client data service formulates the data request with a specific data access operation (read, write, update, delete, add, etc.). The data access operation selected from a generic API. The backend resource uses a different operation or set of operations to perform the generic API operation this different operation or set of different operations selected from an entirely different API. The translation of the operations and data request in general handled by the data providers discussed above with reference to the method 100 of the FIG. 1.

At 220, the client data service subsequently receives results in response to making the request at 211. The results are received from the server, such as the middle-tier data access service of the method 100. Also, the results are in the first format; that is, the same first format that the client data service issued the data request to the server in.

In an embodiment, at 221, the client data service parses metadata from the results in the first format and evaluates portions of the metadata in response to or based on a policy. So, auditing information can be gleaned from the results and policy may instruct actions to be performed in response to or based on that auditing information.

According to an embodiment, at 230, the client data service issues a second request to the server for other data of a different backend resource of the server. Again, the second request is in the first format and the different backend resource uses a different third format that is different from the first format and the second format used by the backend resource associated with the initial data request. Subsequently, the client data service receives second results in response to the second request from the server and these second results are also in the first format. So, the client data service just processes the generic data format or the first format.

The scenario of 230 presents a variety of novel opportunities. For example, at 231, the client data service can join or merge the results (of 220) and the second results (of 230) to form new third results. Technically, the third results can include data fields not present in the original backend resource and other data fields not present in the different backend resource used with the second data request.

In another case, at 240, the client data service caches the results in the first format in a client cache of a client that processes the client data service. Here, the client lacks the capability to cache or provide caching services for the second format (format required by the backend resource); but, the client can use existing caching services to cache the results in the first format. So, capabilities of clients can be extended via the generic first format processing. Caching can be sensitive to the format of the data and the structure of the data. Some structures may not support caching unless various other special modules are in place. So, in this embodiment, the client and its client cache lacks support to providing caching services for the second format but caching still occurs because the client has the support to cache the first format and the results are provided in the first format (translated by the data provider from the second format to the first format).

FIG. 3 is a diagram of a generic data access system 300, according to an example embodiment. The generic data access system 300 is implemented in a machine-accessible and computer-readable storage medium as instructions that execute on one or more processors (multiprocessor) and that is operational over a network. The one or more processors are specifically configured to process the components of the generic data access system 300. Moreover, the network may be wired, wireless, or a combination of wired and wireless. In an embodiment, the generic data access system 300 implements, among other things, certain aspects of the methods 100 and 200 represented by the FIGS. 1 and 2, respectively.

The generic data access system 300 includes a middle-tier data access service 301 and a plurality of client data access services 302. Each of these and their interactions with one another will now be discussed in turn.

The middle-tier data access service 301 is implemented within and resides within a computer-readable storage medium and is to process on one or more processors of the network that comprise a server. Example aspects of the middle-tier data access service 301 were presented in detail above with reference to the method 100 the FIG. 1.

The middle-tier data access service 301 is configured to receive data requests in a generic format and configured to locate specific data providers that can use the generic format to process the data requests in native formats of backend resources to which the data requests are directed.

According to an embodiment, the middle-tier data access service 301 is configured to manage a global cache that synchronizes the data results with client caches of the clients of the client data access services 302.

In another situation, the middle-tier data access service 301 is configured to enforce access policy against the data requests and the results before providing to the client data access services 302.

Each of the client data access services 302 is implemented within and resides within a computer-readable storage medium. Moreover, each client data access service 302 processes on a client of the network. Example aspects of the client data access services 302 were presented in detail above with reference to the method 200 of the FIG. 2.

The client data access services 302 are configured to issue the data requests to the middle-tier data access service 301 and configured to receive results from the data providers of the middle-tier data access service 301. The data requests issued in the generic format and the results received in the generic format.

In an embodiment, the client data access services 302 are configured to merge or join results from disparate backend resources via the generic format.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a non-transitory computer-readable storage medium for execution by one or more processors, the method comprising:
  locating, over a network, a data provider to handle a request from a client for access to a backend resource, wherein locating further includes consulting a registration service with a backend resource identifier for the backend resource to locate the data provider;
  using, over the network, the data provider to process the request on behalf of the client, the data provider translating the request from a first format provided by the client to a second format recognized by the backend resource; and
  acquiring audit information for results provided in metadata associated with the results and the request and maintaining the results and the request in the first format for auditing, and wherein acquiring further includes obtaining from the metadata: a principal identifier for a principal making a request from the client, a data provider identifier for the data provider, an operation identifier for any operation performed with the request, a date and time stamp, and an indication as to policy used and whether that policy was violated, and using the policy to take actions based on the results, the results provided by the backend resource in response to processing the request in the second format and processing the metadata for enforcing security, auditing, logging, and reporting.

2. The method of claim 1 further comprising, synchronizing the results with the client.

3. The method of claim 2 further comprising, synchronizing a server cache with a client cache of the client to include the results.

4. The method of claim 1 further comprising, filtering the results provided by the backend resource before providing to the client based on the policy.

5. The method of claim 1 further comprising, joining or merging the results with other results previously provided based on the policy.

6. The method of claim 1, wherein using further includes translating the request to a generic format and providing to the data provider in the generic format as the first format.

7. The method of claim 1, wherein acquiring further includes receiving the results directly from the data provider in the generic format when the backend resource produces the results in the second format.

8. The method of claim 1 further comprising, using the auditing information to enforce security against the client on the results.

9. The method of claim 1 further comprising, reporting based on the auditing information.

10. The method of claim 1 further comprising, logging based on the auditing information.

11. A method implemented and residing within a non-transitory computer-readable storage medium for execution by one or more processors, the method comprising:
  translating a data request received over a network from a client device from a first format into a generic format, the data request directed by the client device to a backend resource unavailable on the client device;
  searching for a data provider to handle the data request using the generic format, the data provider translates the generic format to a second format handled by the backend resource, wherein searching further includes consulting a registration service with a backend resource identifier to locate the data provider;
  instructing the data provider to interact with the backend resource to produce results for the data request in the second format while maintaining the data request and the results in the first format for auditing;
  receiving from the data provider the results and metadata in the generic format and obtaining audit information from the metadata that includes: a principal identifier for a principal making a request from the client device, a data provider identifier for the data provider, an operation identifier for any operation performed with the data request, a date and time stamp, and an indication as to policy used and whether that policy was violated and processing the metadata for enforcing security, auditing; logging, and reporting; and
  enforcing the policy based on the results before providing the results to the client device.

12. The method of claim 11, wherein enforcing further includes enforcing security on portions of the results provided to the client device based on the policy.

13. The method of claim 11, wherein enforcing further includes imposing auditing on access to the results by the client device based on the policy.

14. The method of claim 11, wherein enforcing further includes reporting and logging the results and access of the client device to the results based on the policy.

15. The method of claim 11, wherein enforcing further includes filtering out some of the results before providing to the client device based on the policy.

16. The method of claim 11 further comprising, synchronizing the results with a cache of the client device.

17. The method of claim 16, wherein synchronizing further includes synchronizing the results of a sever cache for a server with the cache of the client device.

18. A method implemented and residing within a non-transitory computer-readable storage medium for execution by one or more processors, the method comprising:
  issuing, from a client, a request for data directed to a backend resource, the request in a first format and the backend resource recognizing a second format to handle the request and including, by the client, audit information in the request as metadata for the request, the metadata at least including: a principal identifier for a principal making a request from the client and a date and time stamp and the backend resource processing the metadata for enforcing security, auditing, logging, and reporting;
  receiving, on the client, filtered results in the first format from a data provider acting on behalf of the client with the backend resource and maintaining the request and the filtered results in the first format for auditing, wherein receiving further includes consulting a registration service with a backend resource identifier to locate the data provider, and wherein the filtered results processed based on policy evaluation by a server that locates the data provider and receives results from the data provider before the client and filters them based on the policy into the filtered results.

19. The method of claim 18 further comprising, caching the filtered results in a cache of the client for subsequent use on the client.

20. The method of claim 18 further comprising, enforcing security on the client based on parsed security restrictions that accompany the filtered results.

* * * * *

UNITED STATES PATENT AND TRADEMARK OFFICE
CERTIFICATE OF CORRECTION

PATENT NO. : 9,515,948 B2  
APPLICATION NO. : 13/864693  
DATED : December 6, 2016  
INVENTOR(S) : Lowry et al.

Page 1 of 1

It is certified that error appears in the above-identified patent and that said Letters Patent is hereby corrected as shown below:

In the Claims

In Column 8, Line 24, in Claim 11, delete "auditing;" and insert --auditing,--, therefor Signed and Sealed this  
Eleventh Day of June, 2019

Andrei Iancu  
*Director of the United States Patent and Trademark Office*